3,275,706
PROPYLENE DIMERIZATION PROCESS
Paul R. Stapp, Bartlesville, Okla., assignor to Phillips
Petroleum Company, a corporation of Delaware
No Drawing. Filed Dec. 26, 1962, Ser. No. 247,318
6 Claims. (Cl. 260—683.15)

This invention relates to an improved propylene dimerization process. In another aspect, this invention relates to an improved and novel catalyst which is useful in a propylene dimerization process.

Considerable interest has been expressed in the hexene isomers. For example, 4-methyl-1-pentene has been shown to be an excellent monomer in various polyolefin process. It has been shown that 4-methyl-1-pentene is an excellent comonomer for copolymerization with ethylene in the presence of a chromium oxide catalyst. In such a process, the comonomer provides branched isopropyl groups along the crystalline backbone of the polymer chain, thus modifying the crystallinity to a large extent and providing polymers of lower density and higher melt index. In addition thereto, considerable interest has also been shown in 2-methyl-2-pentene. This hexene isomer is the precursor of isoprene, as 2-methyl-2-pentene can readily be converted to isoprene by pyrolysis.

A variety of processes have been proposed for the production of these hexenes. A process receiving considerable attention is a process for the dimerization of propylene. A proposed process is the dimerization of propylene over a catalyst comprising $KC_8$, a lamellar complex of potassium and graphite.

A disadvantage of the $KC_8$ propylene dimerization process is that potassium is relatively expensive. Catalyst poisons charged to the reaction zone with the propylene feed reacts with the potassium, resulting in a relatively expensive process as the poisoned potassium catalyst must be replaced.

I have discovered an improved propylene dimerization process wherein propylene is dimerized to mixed hexene isomers by contacting the propylene with a catalyst comprising potassium deposited on a hydride whereby the hydride reacts with the water, air and other potassium poisons and contaminants charged to the reaction zone.

An object of my invention is to provide an improved propylene dimerization process.

Another object of my invention is to provide an improved propylene dimerization catalyst.

Other objects, advantages and features of my invention will be readily apparent to those skilled in the art from the following description and the appended claims.

By the process of my invention, propylene is dimerized to mixed hexene isomers by contacting the propylene with a catalyst comprising potassium deposited on a hydride selected from the group consisting of calcium hydride, sodium borohydride, potassium borohydride, lithium aluminum hydride, and sodium aluminum hydride. The catalyst will contain from 5 to 40 weight percent potassium, the remainder comprising one of the above-described hydrides.

The catalyst can be prepared by stirring or mixing the potassium and the hydride together at a temperature above the melting point of potassium. The catalyst can also be prepared in situ when a diluent is employed in the propylene dimerization process. This is to say, that the catalyst can be prepared in the diluent by stirring the potassium and hydride together in the diluent in the reaction zone prior to passing the propylene feed to the said reaction zone.

The process of this invention can be effected in the liquid phase or in the vapor phase. In the liquid phase reaction, the propylene feed is contacted with the hydride-supported potassium catalyst in the presence of an inert diluent. The diluent employed in the dimerization reaction of this invention should be inert with respect to the catalyst and the propylene. Suitable diluents include benzene and the saturated acyclic and alicyclic hydrocarbons. Alkyl-substituted benzenes should be avoided, as such materials will react with potassium under the conditions of the dimerization reaction. Specific examples of diluents which can be employed include benzene, n-pentane, n-hexane, n-heptane, isooctane, cyclohexane, cyclopentane, methylcyclohexane, and decalin. The weight ratio of diluent to propylene will normally range from 10:1 to 1:2, although ratios outside this range can be employed if desired.

When employing a diluent, the process can be conducted by charging the catalyst and the diluent to the reaction zone and thereafter pressuring the desired quantity of propylene into the reaction zone. The propylene to potassium weight ratio will generally range from 10:1 to 125:1. The dimerization reaction is generally conducted at a temperature within the range of from 125° C. to 250° C., preferably above 140° C.

A reaction temperature in the upper portion of the temperature range will lead to increased isomerization of the hexene isomers, thereby producing increased quantities of 2-methyl-2-pentene and 4-methyl-2-pentene. If a lower reaction temperature such as 150° C. is employed, for example, the predominant hexene isomer will be 4-methyl-1-pentene. The yield of a particular hexene isomer recovered from the dimerization of propylene can be manipulated or adjusted by manipulating the dimerization reaction temperature, thereby enabling the production of substantial yields of the desired hexene isomer.

The dimerization reaction time will normally range from 10 to 30 hours, although the time of reaction is not critical to the process. Dimerization reaction can be conducted either batchwise or continuously.

As previously noted, it is within the scope of this invention to conduct the dimerization reaction in the vapor phase. In a vapor phase dimerization process, the vaporous propylene can be contacted with the catalyst at a temperature somewhat lower than employed in the liquid phase dimerization reaction process. When conducting a vapor phase dimerization process, temperatures in the range of 100–200° C. and a propylene pressure in the range of 100–1500 p.s.i.g. are normally maintained in the reaction zone.

In a liquid phase dimerization reaction, a slurry of the propylene, diluent and catalyst can be circulated through a loop type reactor and the reaction product subsequently separated from the diluent and catalyst by conventional means. The hexene products can be separated, for example, from the reaction mixture by vaporizing the said hexene products, leaving the diluent and catalyst in the reaction zone. The reaction can then be made continuous by supplying additional propylene to the stripped diluent-catalyst phase.

The potassium-containing catalysts of this invention are superior to the potassium-containing catalysts which have heretofore been employed for the dimerization of propylene. The hydride support of the inventive catalysts is utilized to purify the reaction diluents and propylene without using up the relatively expensive potassium. For example, calcium hydride will react with water, air and other potassium poisons and contaminants. By charging the support to the reaction zone with the diluent, and prior to the potassium charge, the moisture and air present in the reactor can be removed by reaction with the hydride. Moreover, the hydrides are readily available in granular form, thus making them particularly suitable for use in a fixed-bed, continuous process.

The following example is presented to illustrate the advantages of the process of this invention, but it is not in-

Example

A run was conducted in which propylene was dimerized to hexene isomers by the process of this invention. In this run, 15 grams of calcium hydride, 5 grams of potassium and 200 ml. of n-heptane were charged to a Magne Dash autoclave. The autoclave was closed and pressurized to 115 p.s.i.g. with propylene. The amount of propylene charged was 100 grams (2.4 mols). The reaction mixture was then heated to 150° C. and maintained at this temperature for 24 hours. The initial pressure at 150° C. was 550 p.s.i.g., while the final pressure was 330 p.s.i.g. The reactor was then cooled and the unconverted propylene vented through traps while warming the autoclave contents to 40° C. The quantity of unconverted propylene vented was 47.6 grams. The autoclave was then opened and the catalyst filtered off.

The catalyst was inspected and found to be a material which was interspersed with potassium droplets. The catalyst was highly pyrophoric. The catalyst was then washed with n-heptane and the washes combined with the hexene product. The hexene product was then analyzed by vapor phase chromatography on a 150-foot squalane column.

Essentially all of the converted propylene product was hexenes. Analysis of the hexene product was as illustrated below in Table I.

*Table I*

| Hexene isomer: | Wt. percent in product mixture |
|---|---|
| 3-methyl-2-pentene | 1.5 |
| 2-methyl-2-pentene | 7.2 |
| 3-hexene | 0.6 |
| 2-methyl-1-pentene | 1.1 |
| 4-methyl-2-pentene | 37.6 |
| 4-methyl-1-pentene | 52.0 |
| | 100.0 |

As will be evident to those skilled in the art, various modifications of this invention can be made, or followed, in the light of the foregoing disclosure and discussion without departing from the spirit or scope thereof.

I claim:

1. A propylene dimerization process which comprises contacting propylene with a catalyst comprising potassium supported on a hydride selected from the group consisting of calcium hydride, sodium borohydride, potassium borohydride, lithium aluminum hydride, and sodium aluminum hydride.

2. The process of claim 1 wherein the temperature of the contact zone is maintained in the range of 125 to 250° C.

3. The process of claim 1 wherein the weight ratio of propylene to potassium is in the range of 10:1 to 125:1.

4. A propylene dimerization process which comprises contacting propylene with a catalyst in the presence of a diluent, said catalyst comprising potassium deposited on a hydride selected from the group consisting of calcium hydride, sodium borohydride, potassium borohydride, lithium aluminum hydride, and sodium aluminum hydride.

5. A propylene dimerization process which comprises contacting propylene with a catalyst comprising potassium deposited on a hydride selected from the group consisting of calcium hydride, sodium borohydride, potassium borohydride, lithium aluminum hydride, and sodium aluminum hydride, the concentration of potassium based on the weight of the catalyst ranging from 5 to 40 percent.

6. A propylene dimerization process which comprises contacting propylene with a catalyst in the presence of n-heptane, said catalyst comprising potassium deposited on calcium hydride with a weight ratio of 1:3, respectively, a weight ratio of propylene to potassium of 20:1.

References Cited by the Examiner

UNITED STATES PATENTS

| 2,986,588 | 5/1961 | Schramm | 260—683.15 |
| 3,095,461 | 6/1963 | Wilkes | 260—683.15 |

OTHER REFERENCES

Remy: Treatise on Inorganic Chemistry, published by Elsevier, Amsterdam (1956), vol. 1, page 329 relied on.

PAUL M. COUGHLAN, *Primary Examiner.*